(12) United States Patent
Chang et al.

(10) Patent No.: US 8,665,445 B2
(45) Date of Patent: Mar. 4, 2014

(54) DIAGNOSTIC SYSTEM FOR OPTICAL TOUCH CONTROL MODULE AND AUTOMATIC DIAGNOSTIC METHOD THEREOF

(71) Applicant: Wistron Corporation, New Taipei (TW)

(72) Inventors: Lin-Husng Chang, New Taipei (TW); Yu-Yen Chen, New Taipei (TW); Po-Liang Huang, New Taipei (TW); Kai-Chung Cheng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/682,072

(22) Filed: Nov. 20, 2012

(65) Prior Publication Data
US 2013/0301054 A1 Nov. 14, 2013

(30) Foreign Application Priority Data
May 9, 2012 (TW) .............................. 101116543 A

(51) Int. Cl.
*G01N 21/55* (2006.01)
(52) U.S. Cl.
USPC .......................................... 356/447; 356/445

(58) Field of Classification Search
USPC .................. 356/445–448, 228; 345/156–184; 178/18.01–20.04
See application file for complete search history.

(56) References Cited

U.S. PATENT DOCUMENTS

| | | | |
|---|---|---|---|
| 6,480,187 B1 * | 11/2002 | Sano et al. | 345/175 |
| 8,243,047 B2 | 8/2012 | Chiang et al. | |
| 2010/0259507 A1 * | 10/2010 | Yen et al. | 345/175 |
| 2012/0235956 A1 | 9/2012 | Wang | |

* cited by examiner

*Primary Examiner* — Tri T Ton
(74) *Attorney, Agent, or Firm* — Muncy, Geissler, Olds & Lowe, P.C.

(57) ABSTRACT

A diagnostic system for an optical touch control module and an automatic diagnostic method thereof are disclosed. The diagnostic system is used for testing an optical capturing module of the optical touch control module. The diagnostic system includes a controlling module, a first test element, a second test element, and a rotary fixture. The first and the second test element are disposed on a touch surface for allowing the optical capturing module to capture a first and a second test signal. The rotary fixture is used for contacting to the optical capturing module, wherein the controlling module determines whether an image signal captured by the optical capturing module has the first and the second test signal. If not, the controlling module controls the rotary fixture to rotate the optical capturing module to adjust a capturing direction.

10 Claims, 5 Drawing Sheets

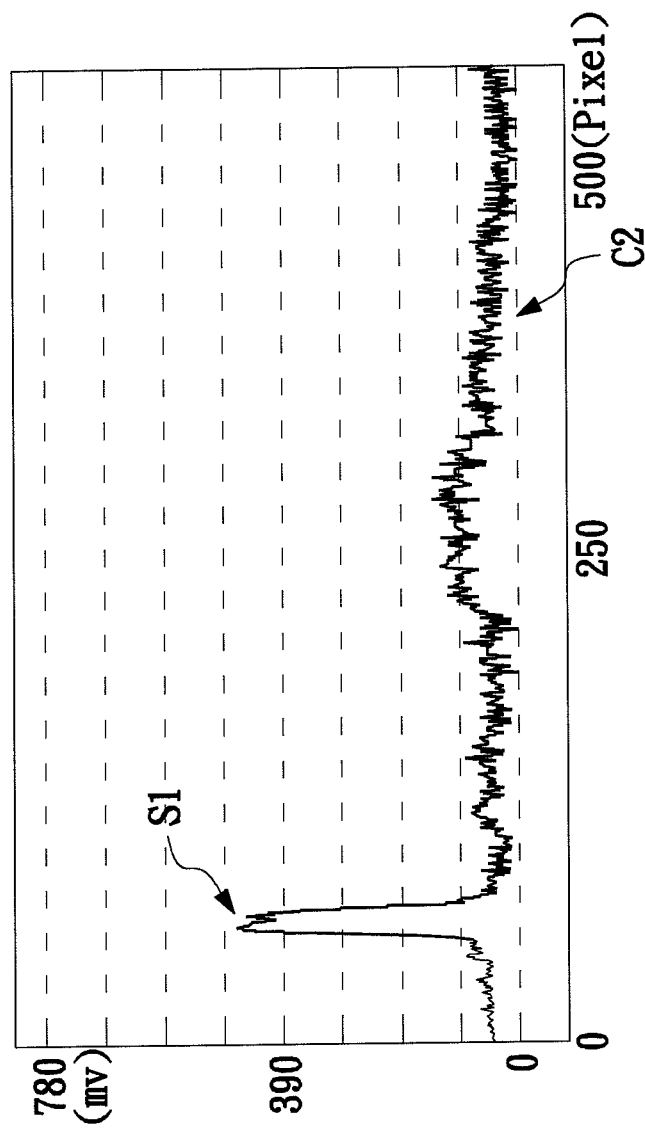

DIAGNOSTIC SYSTEM FOR OPTICAL TOUCH CONTROL MODULE AND AUTOMATIC DIAGNOSTIC METHOD THEREOF

BACKGROUND

1. Field of the Invention

The present disclosure relates to a diagnostic system for an optical touch control module and an automatic diagnostic method thereof, and more particularly to a diagnostic system capable of automatically adjusting a capturing direction of the optical touch control module and an automatic diagnostic method thereof.

2. Description of the Prior Art

With the advancement of technology, an optical touch control module has been developed to use an optical capturing module to capture touch signals. Therefore, testing whether a capturing angle of an optical capturing module in an optical touch system is correct is the required testing procedures for manufacturing the optical touch system. For the assembling procedure in the prior art, the optical capturing module is usually assembled in the direction of the screen diagonal and 45° from the frame to achieve the optimal viewing angle. The assembling of internal components of the optical capturing module may be deviated, causing the direction of the captured image to be deviated. The best viewing angle cannot be achieved if such assembling procedure is used.

Accordingly, it is necessary to devise a new diagnostic system for an optical touch module and provide an automatic diagnostic method thereof to solve the problems occurred in the prior art.

SUMMARY OF THE INVENTION

A major objective of the present disclosure is to provide a diagnostic system for an optical touch module capable of automatically adjusting a capturing direction of the optical touch control module.

Another objective of the present disclosure is to provide an automatic diagnostic method used for the system described above.

To achieve the objectives described above, a diagnostic system for an optical touch module in the present disclosure is used for testing the optical touch control module. The optical touch control module includes a touch surface and an optical capturing module disposed on the touch surface for capturing an image signal from the touch surface. The diagnostic system includes a controlling module, a first test element, a second test element, and a rotary fixture. The controlling module is electrically connected to the optical capturing module. The first test element is disposed on the touch surface for allowing the optical capturing module to capture a first test signal. The second test element is disposed on the touch surface for allowing the optical capturing module to capture a second test signal. The rotary fixture is electrically connected to the controlling module and used for contacting to the optical capturing module, wherein the controlling module determines whether the image signal has the first test signal and the second test signal. If not, the controlling module controls the rotary fixture to rotate the optical capturing module to adjust a capturing direction.

The automatic diagnostic method in the present disclosure comprises the steps of providing a first test element to be disposed on the touch surface; providing a second test element to be disposed on the touch surface; providing an optical capturing module for capturing the first test element and the second test element to obtain an image signal; and determining whether the image signal has a first test signal and a second test signal at the same time, wherein the first test signal and the second test signal are captured by the first test element and the second test element respectively; and if not, rotating the optical capturing module to adjust a capturing direction.

BRIEF DESCRIPTION OF THE DRAWINGS

FIG. 2B is a coordinate graph showing the image signal curve of the diagnostic system in the second embodiment of the present disclosure.

DETAILED DESCRIPTION OF THE PREFERRED EMBODIMENTS

The advantages and innovative features of the disclosure will become more apparent from the following detailed description when taken in conjunction with the accompanying drawings.

Figure 1A:
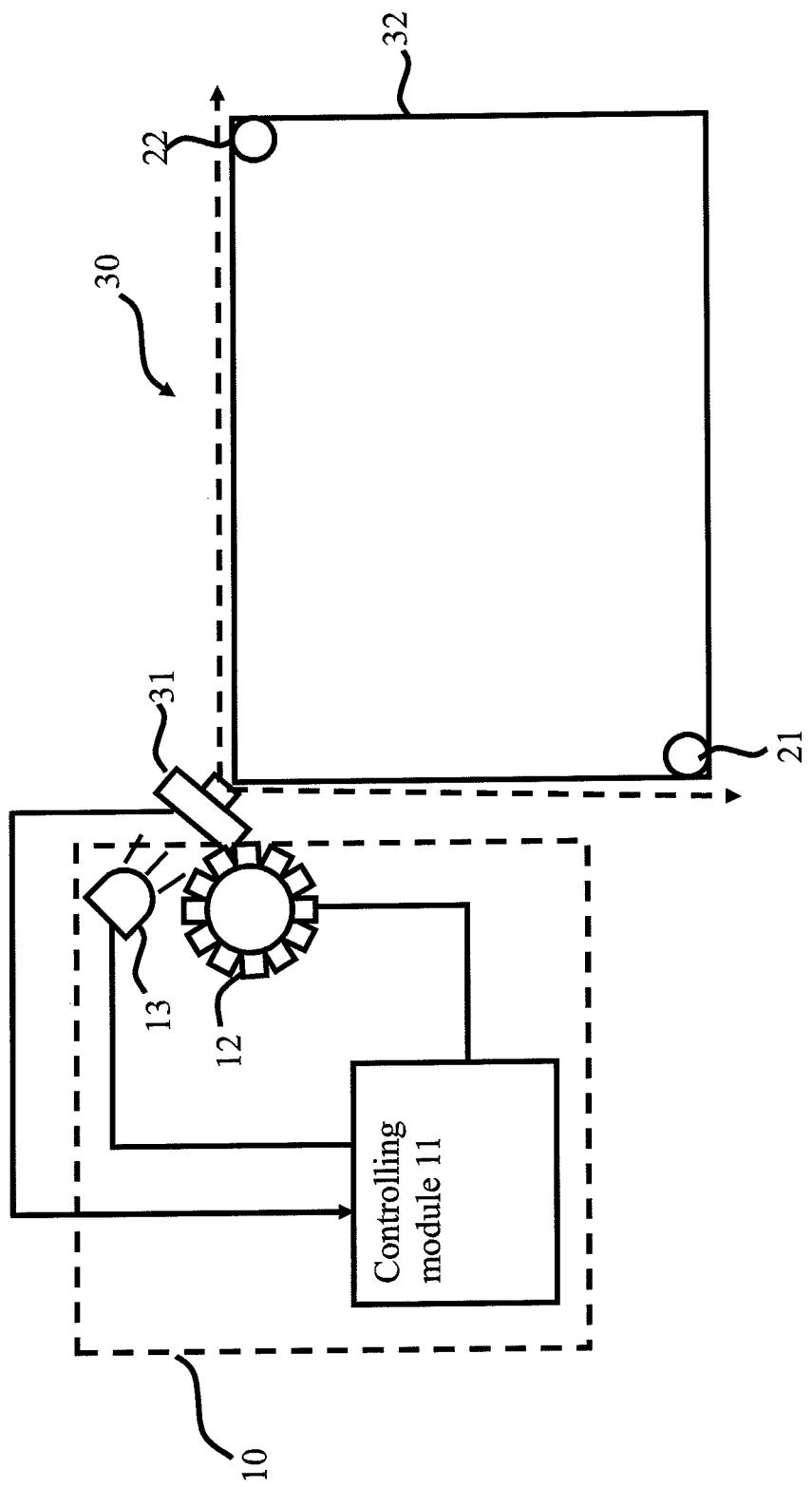
FIG. 1A shows a diagnostic system for testing an optical touch control module in a first embodiment of the present disclosure.

Please referring to FIG. 1A firstly, which shows a diagnostic system for testing an optical touch control module in a first embodiment of the present disclosure.

A diagnostic system 10 in the present disclosure is used for testing whether an optical capturing module 31 in an optical touch control module 30 works correctly. The optical touch control module 30 has at least an optical capturing module 31 and a touch surface 32. The optical capturing module 31 is disposed at an edge of a touch surface 32. In a preferred embodiment, the optical capturing module 31 is disposed at two adjacent corners relative to the touch surface 32. In FIG. 1A, the optical capturing module 31 is disposed at one corner of the touch surface 32 for used as an example for interpretation, but the present disclosure is not limited thereto. The optical capturing module 31 captures images from the touch surface 32 to obtain an image signal. The touch surface 32 is a smooth plane such that the noise captured by the optical capturing module 31 can be diminished. The surrounding of the touch surface 32 can be provided with reflective piping (not shown) such that the optical capturing module 31 can have better capture effects. The operating principle of the optical touch control module 30 has been widely applied by persons skilled by the art, and thus it will not be repeated hereinafter.

The diagnostic system 10 includes a first test element 21, a second test element 22, a controlling module 11, a rotary fixture 12, and a light module 13. The first test element 21 and the second test element 22 are close to the edge of the touch surface 32, and are placed in two opposite corners of the touch surface 32. It means a maximum touch range of the touch surface 32 for providing to the user. The first test element 21 and the second test element 22 may be a reflective material to simulate a reflection signal of a stylus or a finger. Accordingly, the optical capturing module 31 can capture a first test signal S1 for the first test element 21 and a second test signal S2 for the second test element 22 respectively.

The controlling module 11 can be configured by hardware, a combination of hardware and firmware, or a combination of hardware and software. When testing the optical touch control module 30, the controlling module 11 is electrically connected to the optical capturing module 31 to receive an image signal captured by the optical capturing module 31 to determine whether the optical capturing module 31 is configured well by checking whether the image signal has a first test signal S1 and a second test signal S2. The light module 13 is used for projecting an active light source and allows the optical capturing module 31 to capture better image signals. The light module 13 can also be directly disposed inside the optical touch control module 30. However, the present disclosure is not limited to the light module 13 that is only disposed inside the diagnostic system 10.

The rotary fixture 12 is electrically connected to the controlling module 11, and contacts the optical capturing module 31, such that the optical capturing module 31 can adjust a capturing angle through rotation. The rotary fixture 12 can be a motor. In the first embodiment of the present disclosure, if the optical capturing module 31 is assembled correctly, the optical capturing module 31 can capture the first test signal S1 through the first test element 21 and the second test signal S2 through the second test element 22 simultaneously. As such, the curve C1 of an image signal captured by the optical capturing module 31 will be shown as that in FIG. 1B, which is a coordinate graph showing the image signal curve of the diagnostic system in the first embodiment of the present disclosure.

Figure 1B:
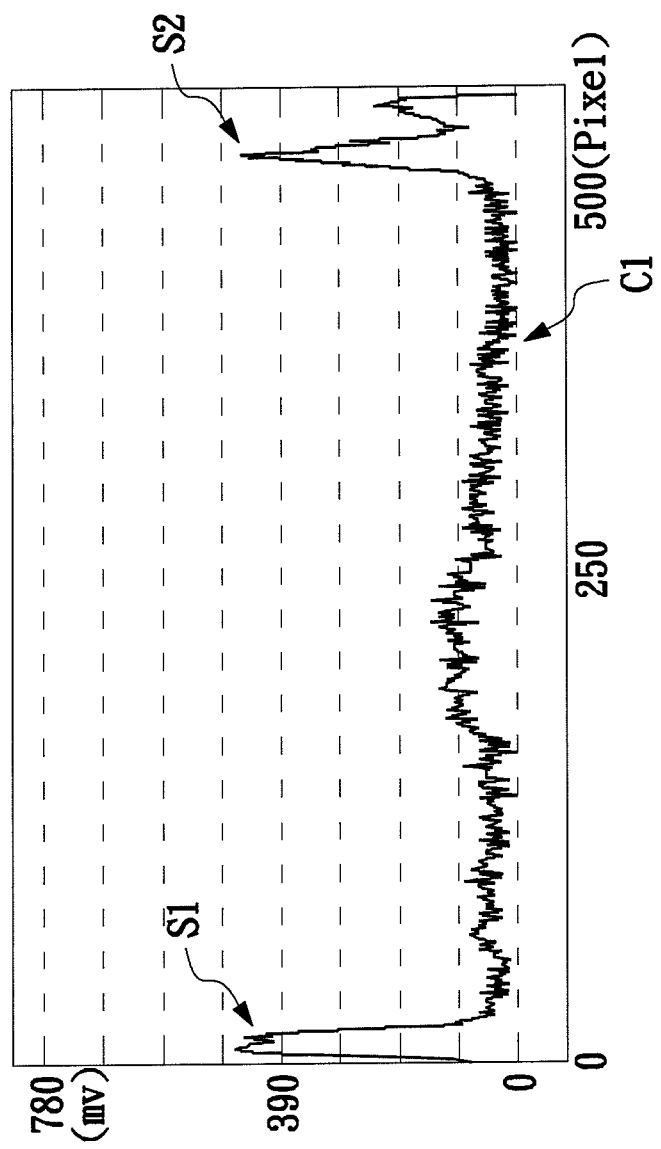
FIG. 1B is a coordinate graph showing the image signal curve of the diagnostic system in the first embodiment of the present disclosure.

As shown in FIG. 1B, the first test signal S1 and the second test signal S2 can be found in both sides of the image signal curve C1. As such, the controlling module 11 ascertains that the optical capturing module 31 is assembled correctly.

Figure 2A:
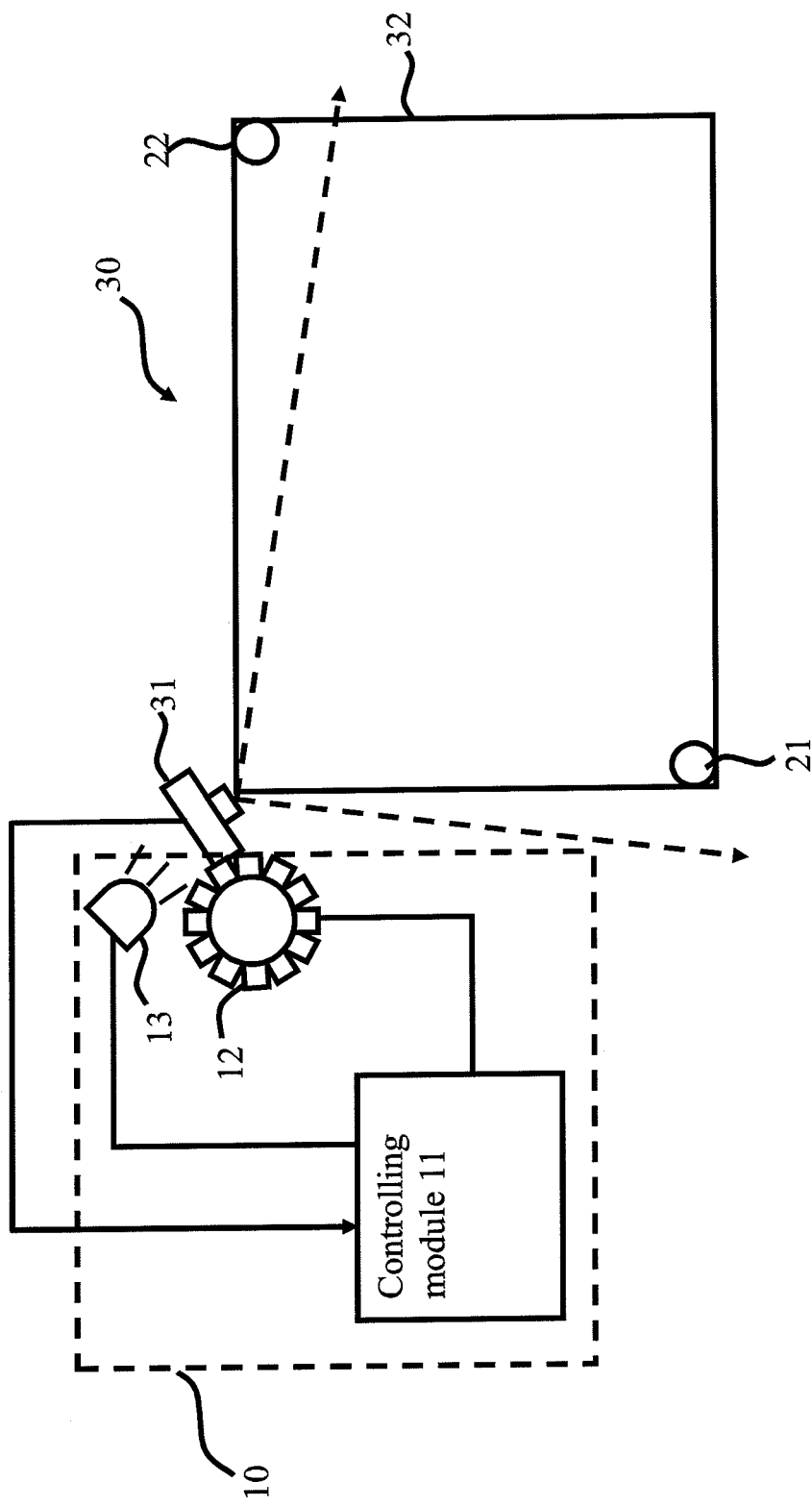
FIG. 2A shows a diagnostic system for an optical touch control module in a second embodiment of the present disclosure.

However, the optical capturing module 31 may be assembled resembling FIG. 2A, which shows a diagnostic system for testing the optical touch control module in a second embodiment of the present disclosure.

In the second embodiment of the present disclosure, if the internal components of the optical capturing module 31 are assembled incorrectly or the assembling upon the touch surface 32 is deviated, the capturing angle of the optical capturing module 31 may be deviated such that one of the test elements cannot be captured. Therefore, the image signal captured by the optical capturing module 31 will resemble the one shown in FIG. 2B, which is a coordinate graph showing the image signal curve of the diagnostic system in the second embodiment of the present disclosure.

As shown in FIG. 2B, the first test signal S1 is only found in one side of the image signal curve C2, and the second test signal S2 is not found. As such, the controlling module 11 ascertains that the capturing direction of the optical capturing module 31 is deviated towards the first test element 2 land the second test element 22 cannot be captured. At this time, the controlling module 11 controls the rotary fixture 12 to rotate the optical capturing module 31 counterclockwise to adjust the capturing direction of the optical capturing module 31 until the image signal curve C1 resembling FIG. 1B is obtained.

Figure 3:
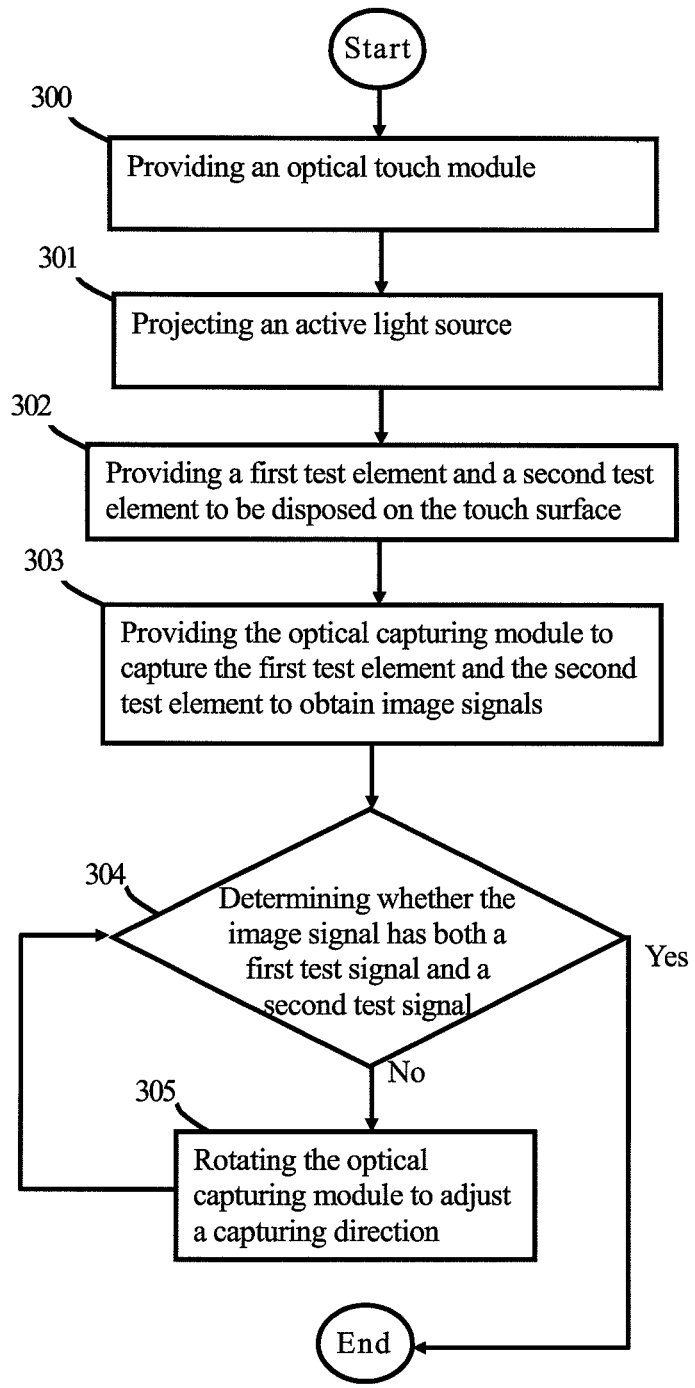
FIG. 3 is a flow chart showing the steps of the automatic diagnostic method in the present disclosure.

Then, referring to FIG. 3, which is a flow chart showing the steps of the automatic diagnostic method in the present disclosure. It should be noted that although the diagnostic system 10 is used as an example hereinafter to describe the automatic diagnostic method of the present disclosure, the automatic diagnostic method of the present disclosure is not limited to the diagnostic system 10 mentioned above.

At first, Step 300 is performed to provide an optical touch module.

Before the diagnostic system 10 performs diagnostic, a set of optical touch control module 30 with the optical capturing module 31 and the touch surface 32 mounted therein is provided first, while the optical capturing module 31 is electrically connected to the controlling module 11, wherein the optical capturing module 31 can be assembled in the direction of the diagonal of the touch surface 32 and 45° from the frame of the touch surface 32.

Then, the method goes to Step 301: projecting an active light source.

Next, the active light source is projected from the light module 13 to the touch surface 32. The light module 13 can project the active light source in accordance with the control of the controlling module 11, but the present disclosure is not limited to this.

Next, the method goes to Step 302: providing a first test element and a second test element to be disposed on the touch surface.

Then, the first test element 21 and the second test element 22 are disposed in an edge of the touch surface 32, and disposed in the opposite corners of the touch surface 32 as the basis reference for the capturing edge of the optical capturing module 31.

Then, the method goes to Step 303: providing the optical capturing module to capture the first test element and the second test element to obtain image signals.

Then, the optical capturing module 31 captures the first test element 21 and the second test element 22 on the touch surface 32, and transmits the captured image signal to the controlling module 11.

Afterwards, the method goes to Step 304 determining whether the image signal has both a first test signal and a second test signal.

After the image signal is received, the controlling module 11 determines whether the image signal has both a first test signal S1 captured by the first test element 21 and a second test signal S2 captured by the second test element 22. If the image signal has both the first test signal S1 and the second test signal S2 (e.g. the image signal curve C1 shown in FIG. 1B), the controlling module 11 ascertains that the optical capturing module 31 is assembled correctly. As such, the automatic diagnostic procedure will be finished.

If the image signal only has the first test signal S1 or the second test signal S2 (e.g. the image signal curve C2 shown in FIG. 2B), Step 305 will be performed to rotate the optical capturing module to adjust a capturing direction.

At this time, the controlling module 11 ascertains that the optical capturing module 31 is assembled incorrectly which leads to the deviation of the capturing direction. As such, the controlling module 11 will control the rotary fixture 12 to rotate the optical capturing module 31 to adjust a capturing direction of the optical capturing module 31. Take FIG. 2A for example, when the optical capturing module 31 only captures the first test signal S1, the rotary fixture 12 will drive the optical capturing module 31 to rotate counterclockwise. Similarly, when the optical capturing module 31 only captures the second test signal S2, the rotary fixture 12 will drive the optical capturing module 31 to rotate clockwise. Then, go back to Step 304 and repeat the determination until the capturing direction of the optical capturing module 31 is confirmed correct.

It should be noted here that the automatic diagnostic method in the present disclosure is not limited to the order of the steps described above. The order of the steps described above can be changed as long as the objectives of the present disclosure can be achieved.

Through the system and test procedures described above, the diagnostic system 10 can automatically adjust the capturing direction of the optical capturing module 31 without human judgment, by which a lot of labor cost and time can be saved.

It is noted that the above-mentioned embodiments are only for illustration. It is intended that the present disclosure cover modifications and variations of this disclosure provided they fall within the scope of the following claims and their equivalents. Therefore, it will be apparent to those skilled in the art that various modifications and variations can be made to the structure of the present disclosure without departing from the scope or spirit of the disclosure.

What is claimed is:

1. A diagnostic system for an optical touch module, used for testing an optical touch control module comprising a touch surface and an optical capturing module, the optical capturing module is disposed on the touch surface to capture a image signal from the touch surface, the diagnostic system comprising:
    a controlling module, electrically connected to the optical capturing module;
    a first test element, disposed on the touch surface for allowing the optical capturing module to capture a first test signal;
    a second test element, disposed on the touch surface for allowing the optical capturing module to capture a second test signal;
    wherein the first test element and the second test element are used for simulating a stylus or a finger;
    wherein a position of the first test element and second test element forms a maximum touch range of the touch surface for providing to a user; and
    a rotary fixture, electrically connected to the controlling module and used for contacting to the optical capturing module, wherein the controlling module determines whether the image signal has the first test signal and the second test signal, if not, the controlling module controls the rotary fixture to rotate the optical capturing module to adjust a capturing direction.

2. The diagnostic system for the optical touch module as claimed in claim 1, wherein the first test element and the second test element are respectively disposed in opposite corners of the touch surface.

3. The diagnostic system for the optical touch module as claimed in claim 1, wherein the diagnostic system further comprises a light module for projecting an active light source.

4. The diagnostic system for the optical touch module as claimed in claim 1, wherein the first test element and the second test element can be a reflective material.

5. The diagnostic system for the optical touch module as claimed in claim 1, wherein the rotary fixture is a motor.

6. An automatic diagnostic method used for a diagnostic system to test an optical touch control module comprising a touch surface and an optical capturing module disposed on a touch surface for capturing an image signal relative to the touch surface, the method comprising the steps of:
    providing a first test element to be disposed on the touch surface;
    providing a second test element to be disposed on the touch surface;
    wherein the first test element and the second test element are used for simulating a stylus or a finger; wherein a position of the first test element and second test element forms a maximum touch, range of the touch surface for providing to a user;
    providing an optical capturing module for capturing the first test element and the second test element to obtain an image signal;
    determining whether the image signal has a first test signal and a second test signal at the same time, wherein the first test signal and the second test signal are obtained by capturing the first test element and the second test element respectively; and
    if not, rotating the optical capturing module to adjust a capturing direction.

7. The automatic diagnostic method as claimed in claim 6, further comprising the following step:
    disposing the first test element and the second test element in opposite corners of the touch surface respectively.

8. The automatic diagnostic method as claimed in claim 6, further comprising the step of projecting an active light source.

9. The diagnostic system for the optical touch module as claimed in claim 1, wherein the first test element and the second test element are a reflective material.

10. The automatic diagnostic method as claimed in claim 6, wherein the first test element and the second test element are a reflective material.

* * * * *